United States Patent
Zhang et al.

(10) Patent No.: US 7,552,049 B2
(45) Date of Patent: *Jun. 23, 2009

(54) NOISE ADAPTATION SYSTEM OF SPEECH MODEL, NOISE ADAPTATION METHOD, AND NOISE ADAPTATION PROGRAM FOR SPEECH RECOGNITION

(75) Inventors: Zhipeng Zhang, Tokyo (JP); Kiyotaka Otsuji, Kamakura (JP); Toshiaki Sugimura, Yokohama (JP); Sadaoki Furui, Tokyo (JP)

(73) Assignees: NTT DoCoMo, Inc., Tokyo (JP); Sadaoki Furui, Tokyo (JP)

( * ) Notice: Subject to any disclaimer, the term of this patent is extended or adjusted under 35 U.S.C. 154(b) by 975 days.

This patent is subject to a terminal disclaimer.

(21) Appl. No.: 10/796,283

(22) Filed: Mar. 10, 2004

(65) Prior Publication Data

US 2004/0204937 A1    Oct. 14, 2004

(30) Foreign Application Priority Data

Mar. 12, 2003  (JP)  ............................. 2003-066933

(51) Int. Cl.
    *G10L 15/00*  (2006.01)
(52) U.S. Cl. ........................ 704/231; 704/233; 704/245; 704/250
(58) Field of Classification Search .............. 704/231, 704/233, 245, 250
    See application file for complete search history.

(56) References Cited

U.S. PATENT DOCUMENTS

| | | | |
|---|---|---|---|
| 5,860,062 A |   | 1/1999 | Taniguchi et al. |
| 5,960,397 A | * | 9/1999 | Rahim ........................ 704/244 |
| 6,026,359 A | * | 2/2000 | Yamaguchi et al. ......... 704/256.4 |
| 6,182,270 B1 | * | 1/2001 | Feldmann et al. ............... 716/5 |
| 6,529,872 B1 | * | 3/2003 | Cerisara et al. ............. 704/250 |
| 7,089,183 B2 | * | 8/2006 | Gong .......................... 704/244 |
| 2004/0093210 A1 | * | 5/2004 | Toyama ....................... 704/233 |
| 2004/0230420 A1 | * | 11/2004 | Kadambe et al. ............ 704/205 |
| 2005/0080623 A1 | * | 4/2005 | Furui et al. .................. 704/233 |

OTHER PUBLICATIONS

Sadaoki Furui et al., "Neural-Network-Based HMM Adaptation For Noisy Speech Recognition", Acoust. Sci. & Tech. 24, 2 (2003), pp. 69-75, XP009031581.

(Continued)

*Primary Examiner*—Daniel D Abebe
(74) *Attorney, Agent, or Firm*—Crowell & Moring LLP (57) ABSTRACT

An object of the present invention is to enable optimal clustering for many types of noise data and to improve the accuracy of estimation of a speech model sequence of input speech. Noise is added to speech in accordance with noise-to-signal ratio conditions to generate noise-added speech (step S1), the mean value of speech cepstral is subtracted from the generated, noise-added speech (step 2), a Gaussian distribution model of each piece of noise-added speech is created (step S3), the likelihoods of the pieces of noise-added speech are calculated to generate a likelihood matrix (step S4) to obtain a clustering result. An optimum model is selected (step S7) and linear transformation is performed to provide a maximized likelihood (step S8). Because noise-added speech is consistently used both in clustering and model learning, clustering for many types of noise data and an accurate estimation of a speech model sequence can be achieved.

8 Claims, 5 Drawing Sheets

OTHER PUBLICATIONS

Zhipeng Zhang et al., "Piecewise-Linear Transformation-Based HMM Adaptation For Noisy Speech", IEEE Workshop on Automatic Speech Recognition and Understanding, pp. 159-162, 2002.

Zhipeng Zhang et al.; "Effects of Tree-Structure Clustering in Noise Adaptation Using Piecewise Linear Transformation;" 2002 Autumn Meeting of the Acoustical Society of Japan, pp. 29-30.

Furui, "Cepstral Analysis Technique for Automatic Speaker Verification;" IEEE Transaction on Acoustical Speech and Signal Processing, vol. ASSP-29, pp. 254-272, 1981.

Seiichi Nakagawa, "Speech Recognition with Probailistic Model;" Institute of Electronics, Information and Communication Engineers, 1998.

Sugamura et al., "Speaker Independent Recognition of Isolated Words Based on Multiple Reference Templates in SPLIT System," (Speech Committee document) (S82-64, 1982), pp. 506-507.

J. J. F. Gales et al., "Mean and Variance Adaptation Within the MLLR Framework," pp. 249-264, 1996.

* cited by examiner

NOISE ADAPTATION SYSTEM OF SPEECH MODEL, NOISE ADAPTATION METHOD, AND NOISE ADAPTATION PROGRAM FOR SPEECH RECOGNITION

BACKGROUND OF THE INVENTION

1. Field of the Invention

The present invention relates to a noise adaptation system of speech model, a noise adaptation method, and a noise adaptation program for speech recognition. In particular, the present invention relates to a noise adaptation system of speech model, a noise adaptation method, and a noise adaptation program for speech recognition that use noisy speech to be recognized to adapt a clean speech model generated by modeling features of speech by means of a Hidden Markov Model (HMM) so that the recognition rate for the noisy environment can be improved.

2. Description of the Related Art

A tree-structure piecewise linear transformation approach is described in the following Non-Patent Document 1. According to the approach described in the document, noise is clustered, a tree-structure noisy speech model space is generated based on the result of the clustering, a speech feature parameter of input noisy speech to be recognized is extracted, an optimum model is selected from the tree-structure noisy speech model space, and linear transformation is applied to the selected model so as to increase the likelihood of the selected model, thereby improving the accuracy for input speech.

(Non-Patent Document 1)

"Effects of tree-structure clustering in noise adaptation using piecewise linear transformation" by Zhipeng Zhang et al. (2002 Autumn Meeting of the Acoustical Society of Japan, pp. 29-30)

In the process of generating a noise-added speech model in the document cited above, only noise data is clustered and then noise is added to the speech, and the noise-added speech model is learned. This approach has a problem that discrepancies arise between features of the noise in the clustering process and features of the noise-added speech model in the model learning process.

SUMMARY OF THE INVENTION

The present invention has been made to overcome this drawback of the prior art and a first object of the present invention is to provide a noise adaptation system of speech model, a noise adaptation method, and noise adaptation program for speech recognition that enables optimal clustering for various types of noise data.

A second object of the present invention is to provide a noise adaptation system of speech model, a noise adaptation method, and a noise adaptation program for speech recognition that can provide improved speech recognition rates by using the result of the clustering.

In one aspect of the present invention, there is provided a noise adaptation system of speech model for adapting a speech model for any noise to speech to be recognized in a noisy environment, the speech model being learned by using clean speech data, the system comprising: clustering means for clustering noise-added speech; speech model space generating means for generating a tree-structure noisy speech model space based on the result of the clustering performed by the clustering means; parameter extracting means for extracting a speech feature parameter of input noisy speech to be recognized; selecting means for selecting an optimum model from the tree-structure noisy speech model space generated by the speech model space generating means; and linear transformation means for applying linear transformation to the model selected by the selecting means so that the model provides a further increased likelihood. Because noise-added speech is consistently used both in the clustering process and model learning process, optimal clustering for many type of noise data and an improved accuracy of estimation of speech model sequence of input speech can be achieved.

According to an embodiment of the present invention, there is provided the noise adaptation system of speech model wherein the clustering means generates the noise-added speech by adding the noise to the speech in accordance with a signal-to-noise ratio condition, subtracts the mean value of speech cepstral of the generated noise-added speech, generates a Gaussian distribution model of each piece of generated noise-added speech, and calculates the likelihood between the pieces of noise-added speech to generate a likelihood matrix to provide a clustering result. This allows noise-added speech to be clustered.

According to another embodiment of the present invention, there is provided the noise adaptation system wherein the selecting means selects a model that provides the highest likelihood for the speech feature parameter extracted by the parameter extracting means. By selecting the model that provides the highest likelihood, the accuracy of speech recognition can be improved.

According to a further embodiment of the present invention, there is provided the noise adaptation system wherein the selecting means selects a model by searching the tree-structure noisy speech model space downward from the highest to the lowest level. By searching the tree structure from the highest level to the lowest level, an optimum model can be selected.

In another embodiment of the present invention, there is provided the noise adaptation system wherein the linear transformation means performs the linear transformation on the basis of the model selected by the selecting means to increase the likelihood. By performing the linear transformation, the likelihood can be maximized.

In another aspect of the present invention, there is provided a speech model noise adaptation method for adapting a speech model for any noise to speech to be recognized in a noisy environment, the speech model being learned by using clean speech data, the method comprising: a clustering step of clustering noise-added speech; a speech model space generating step of generating a tree-structure noisy speech model space based on the result of the clustering performed at the clustering step; a parameter extracting step of extracting a speech feature parameter of input noisy speech to be recognized; a selecting step of selecting an optimum model from the tree-structure noisy speech model space generated at the speech model space generating step; and a linear transformation step of applying linear transformation to the model selected at the selecting step so that the model provides a further increased likelihood. Because noise-added speech is consistently used both in clustering and model learning, an improved accuracy of estimation of a speech model sequence of input speech can be achieved.

According to a variation of the present invention, there is provided a noise adaptation program for speech recognition that controls a computer to adapt a speech model for any noise to speech to be recognized in a noisy environment, the speech model being learned by using clean speech data, the program comprising: a clustering step of clustering noise-added speech; a speech model space generating step of generating a tree-structure noisy speech model space based on the result of the clustering performed at the clustering step; a parameter extracting step of extracting a speech feature parameter of input noisy speech to be recognized; a selecting step of selecting an optimum model from the tree-structure noisy speech model space generated at the speech model space generating step; and a linear transformation step of applying linear transformation to the model selected at the selecting step so that the model provides a further increased likelihood. Because noise-added speech is consistently used both in clustering and model learning, an improved accuracy of estimation of a speech model sequence of input speech can be achieved.

In summary, the present invention uses a noise database to add noise to clean speech in accordance with an SNR condition (step S1 described later). The noise-added speech is clustered to build a tree-structure noise-added speech model space. In the noise-added speech model space, noise at each node is added to the clean speech to build a noise-added speech (step S3 described later). The likelihoods are calculated in the tree-structure mode space of the noise-added speech (step S4 described later), and then the tree structure is searched downward from the top to select an optimum model (step S7 described later). Based on model parameters of an adaptation speech adaptation model sequence thus selected, linear transformation is performed so as to maximize the likelihood (step S8 described later).

Thus, the noise-added speech is used not only in the model learning process but also in clustering. Because noise-added speech is consistently used both in clustering and model learning, the most likely noise-added speech model can be learned. As a result, a higher accuracy of recognition can be achieved.

DETAILED DESCRIPTION OF THE PREFERRED EMBODIMENTS

An embodiment of the present invention will be described below with reference to the accompanying drawings. Like elements are labeled with like reference numerals throughout the drawings referenced in the following description.

In the present invention, a noisy speech model space is built as a tree structure on the basis of signal-to-noise ratios (SNR) and sound qualities. Representing noise characteristics by the tree structure provides a model in which global features of noise are represented at a higher level and local features are represented at a lower level. An optimum piecewise space can be selected by following the tree structure downward from the root in top-down fashion to select an optimum model.

Because noise-added speech is consistently used both in clustering and model learning processes, the noise-added speech model that provides the highest likelihood can be learned and an improved accuracy of recognition can be achieved.

(Configuration of the System)

Figure 1:
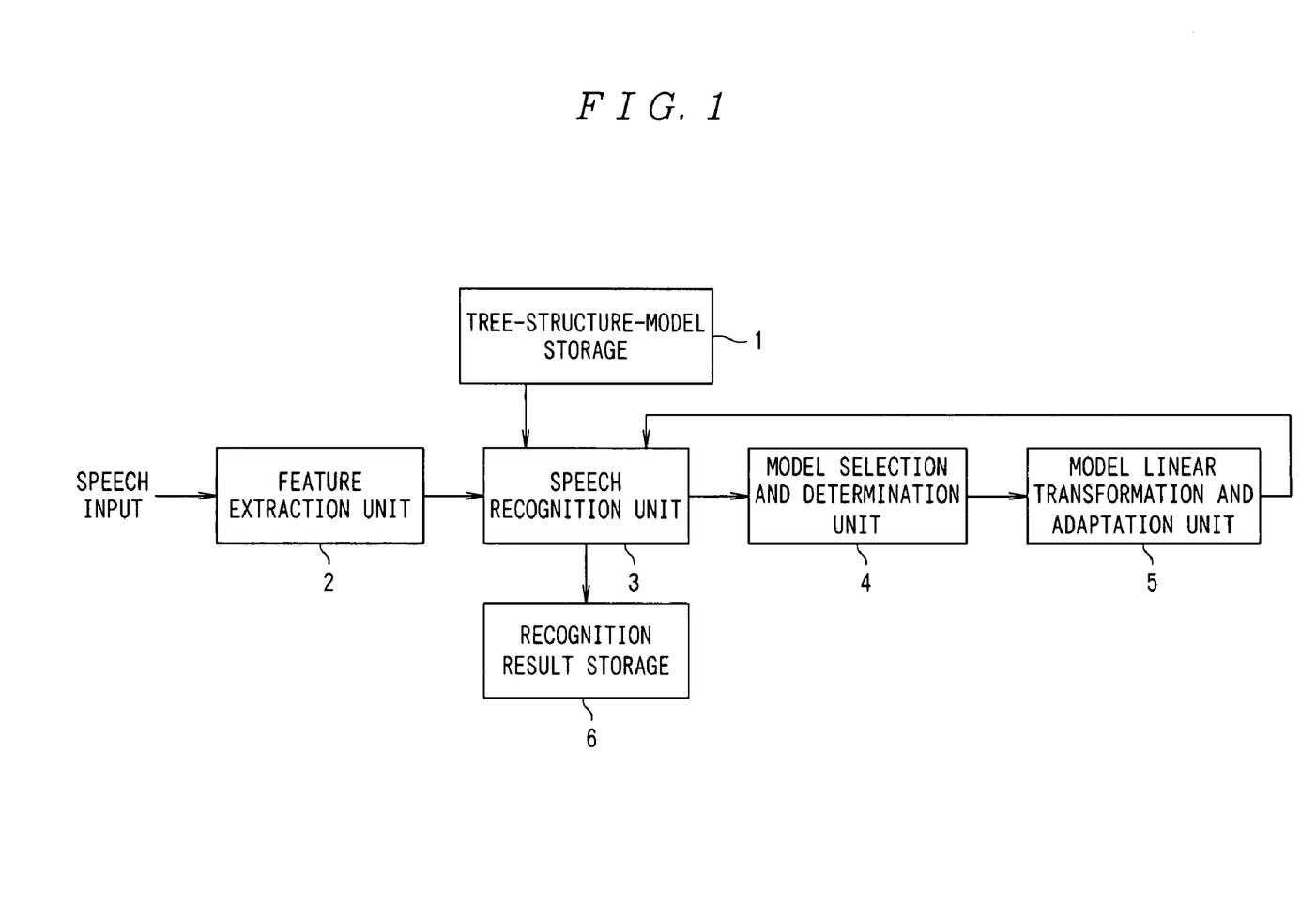
FIG. 1 is a block diagram showing a configuration of a noise adaptation system of speech model according to one embodiment of the present invention.

Referring to FIG. 1, a configuration for implementing the process will be described. FIG. 1 is a block diagram showing an embodiment of a noise adaptation system according to the present invention. The noise adaptation system according to the present embodiment comprises a tree-structure-model storage 1, a feature extraction unit 2, a speech recognition unit 3, a model selection and determination unit 4, a model linear transformation adaptation unit 5, and a recognition result storage 6.

The tree-structure-model storage 1 stores a noise-added speech HMM which has been built as a two-level (SNR and noise characteristic level) tree structure from a result of clustering of noise-added speech.

The feature extraction unit 2 analyzes speech data inputted to it and transforms it into feature vectors.

The speech recognition unit 3 applies a Viterbi algorithm to the time series feature vector time transformed from the input data to obtain a model sequence that provides the highest likelihood function.

The model selection and determination unit 4 selects an optimum model that provides an optimum model that provides the highest likelihood from among models stored in the tree-structure-model storage 1.

The model linear transformation adaptation unit 5 applies linear transformation to the model selected by the model selection and determination unit 4 so as to maximize its likelihood.

The recognition result storage 6 stores speech recognition results.

(Operation of the System)

Figure 2:
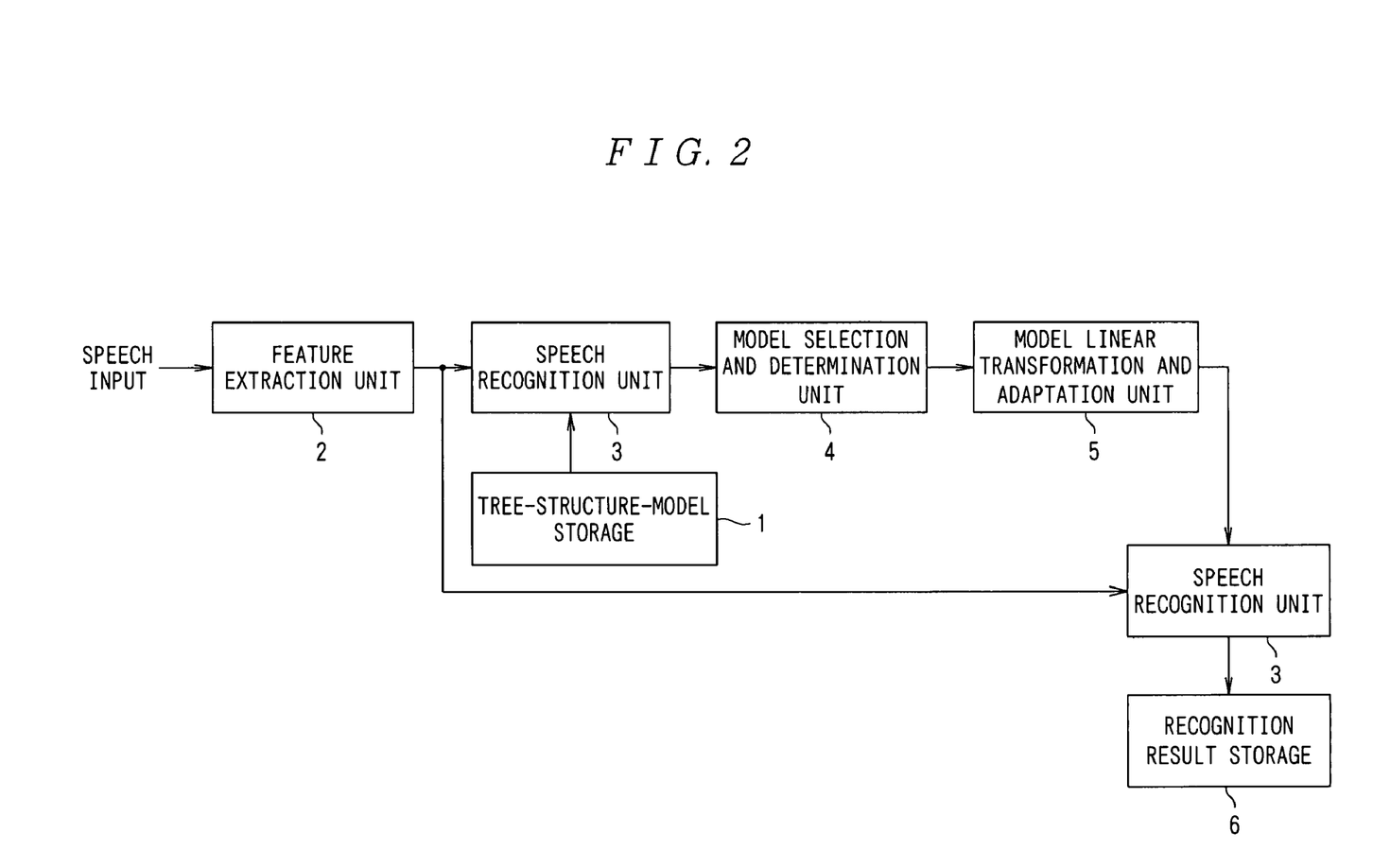
FIG. 2 is a functional block diagram in which the components shown in FIG. 1 are rearranged in accordance with an operation flow in the system.
Figure 3:
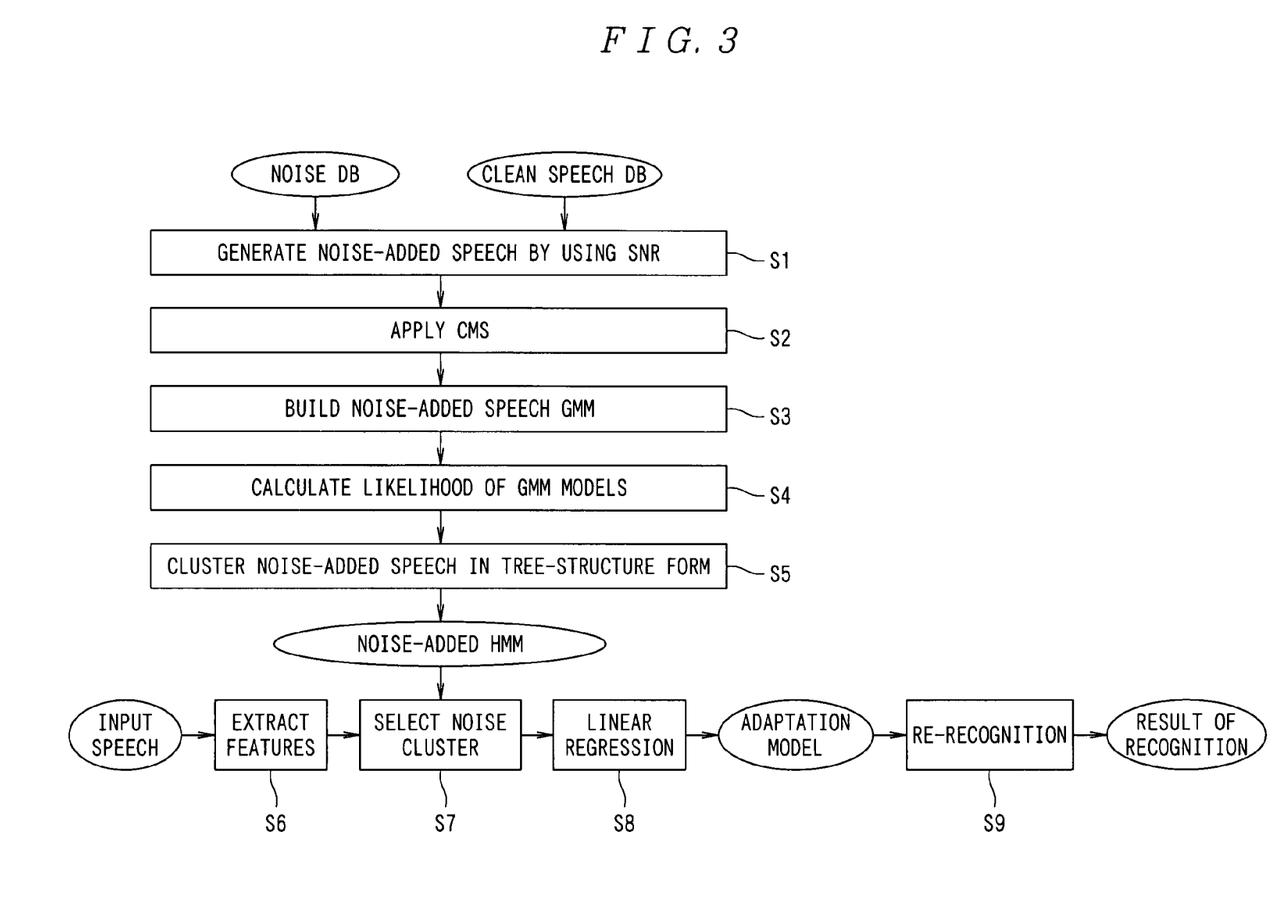
FIG. 3 is a flowchart of a process performed by the system.

Operation of the system having the structure described above will be described with reference to FIGS. 2 and 3. FIG. 2 is a functional block diagram in which the components shown in FIG. 1 are rearranged according to the flow of operation in the system. FIG. 3 is a flowchart of a process performed by the system.

The process for performing speech recognition in the system follows steps S1 to S9 as described below.

Step S1 (the step of generating noise-added speech): A noise database is used to add noise to clean speech on the basis of SNR conditions to generate noise-added speech, where SNR=5, 10, and 15 dB in this example.

Step S2 (the step of subtracting the mean of noise-added speech): CMS (Cepstral Mean Subtraction) is applied to noise-added speech generated at step S1. CMS is a technique for subtracting the mean of speech cepstral. That is, the mean cepstral of value of all frames of speech data in a certain interval is calculated and the mean value is subtracted from the vector of each frame. The cepstral is the Fourier transform of the logarithm of a power spectrum obtained by Fourier transform. The CMS is described in a document entitled "Cepstral Analysis Technique For Automatic Speaker Verification" by Furui (IEEE Transaction on Acoustical Speech and Signal Processing, Vol. ASSP-29, pp. 254-272, 1981).

Step S3 (the step of generating a noise-added speech model): A Gaussian mixture model (GMM) of each noise-added speech is generated by means of the Baum-Welch algorithm. Baum-Welch algorithm is a repetitive approach to getting closer to an optimum value, starting from an appropriate initial value. The Baum-Welch algorithm is described in a document entitled "Speech recognition with probabilistic model" by Seiiich Nakagawa (Institute of Electronics, Information and Communication Engineers, 1988).

Step S4 (the step of clustering noise-added speech): Then the GMM is used to calculate the likelihoods between pieces of noise-added speech to generate a likelihood matrix. A SPLIT method based on the likelihood is used to serially cluster the noise-added speech. In the SPLIT method, clusters that provides the largest distortion are split sequentially. Consequently, any number of clusters can be generated. The result of clustering can be obtained fully automatically simply by giving the number of clusters. The SPLIT method is described in a Speech Committee document by Sugamura et al. (S82-64, 1982).

Step S5 (application to piecewise linear transformation adaptation): A tree-structure clustering result of the noise-added speech is provided by the step S4. The clustering result is stored in the tree-structure model storage 1. The clustering result represents features in tree-structure form. Therefore global features of the noise-added speech are represented at a higher level of the tree structure and local features of the speech are represented at a lower level.

The clustering result is applied to piecewise linear transformation. The piecewise linear transformation is described in an article by Zhang et al. (Proceedings of the 2002 Autumn Meeting of the Acoustical Society of Japan, pp. 29-30). In particular, steps S6 to S9 described below are performed.

Step S6 (the step of extracting feature quantities); The feature extraction unit 2 extracts feature quantities from noise-added speech data to be recognized. In the feature quantity extraction, LPC (Linear Prediction Coding) analysis is applied to each frame of inputted speech data to obtain time series feature parameter vectors such as a cepstral or Δcepstral, as a feature parameter sequence.

Figure 4:
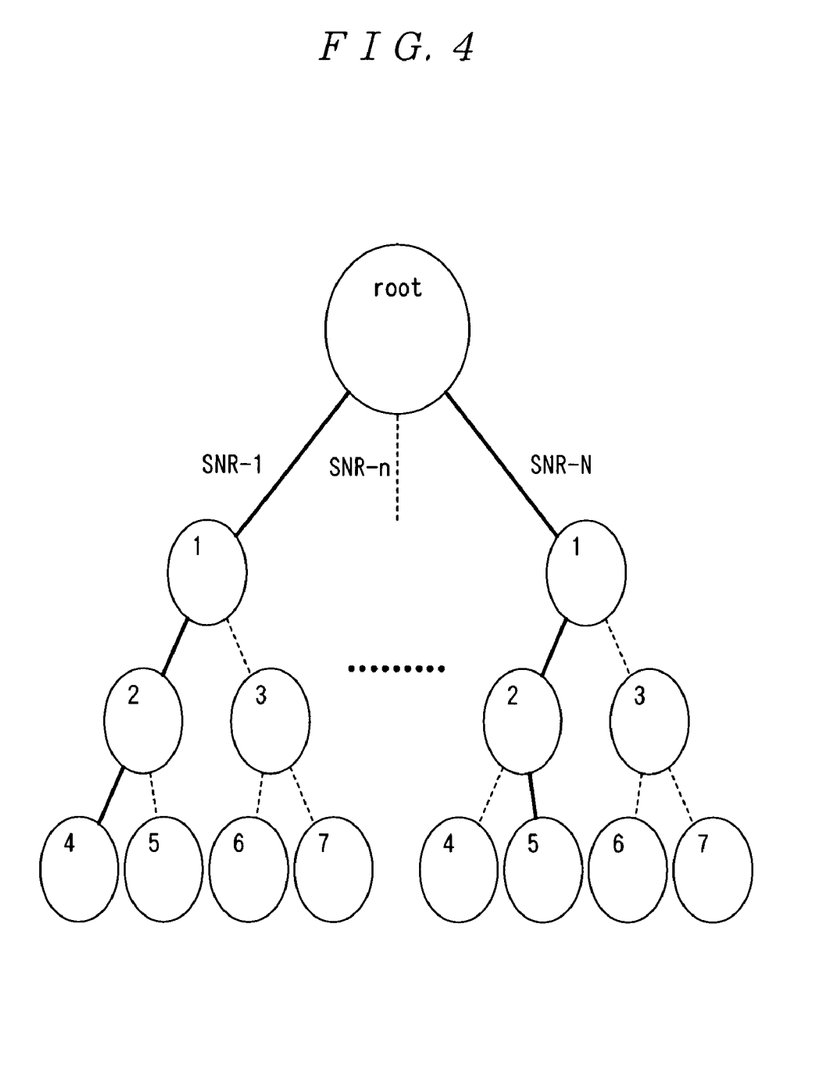
FIG. 4 is a conceptual diagram showing a process for selecting an optimum model in a tree-structure noisy speech model space.

Step S7 (selecting an optimum model): The step of selecting an optimum model will be described with reference to FIG. 4. The node (root) at the top of FIG. 4 represents a clean speech model. Under the root, there are N models as for each of the SNRs. N models are namely model SNR-1 to model SNR-N. The N models SNR-1 to SNR-N represent models learned from speech generated by adding all types of noise under certain SNR conditions.

Child nodes below them represent models learned from speech data generated by adding some selected types of noise depending on the clustering result. At the bottom of the tree structure are models learned from speech that are generated by adding only a certain single type of noise. Thus, global noise characteristics are represented at the higher level of the tree structure and local noise characteristics are represented at the lower level.

To perform recognition, the likelihood of a given clean model at root is first calculated by using the feature parameter sequence obtained at step S4. This is performed by the speech recognition unit 3 shown in FIG. 1.

Then, the speech recognition unit 3 uses the models below the root to calculate the likelihoods. The likelihood values thus calculated are used by the model selection and determination unit 4 to select an optimum model. In particular, this is achieved by following the following procedure. Models providing likelihoods higher than that of the clean model at root are reserved. Then the models at the child nodes below them are used to calculate the likelihoods under these SNR conditions. The likelihoods of two child node models are compared with that of the parent node. If a child node model provides the highest likelihood, the likelihoods of the child node models below that node are calculated. On the other hand, if the likelihood of the parent node is higher than those of the child node model, then no further calculation is performed and the parent node is determined as an optimum node.

In FIG. 4, the search paths are represented by solid lines. The calculation can be repeated to find an optimum space. Furthermore, the likelihood of the highest-likelihood models under different SNR conditions are compared one another to determine the model providing the highest likelihood among them is selected as the optimum model in the entire noisy speech space. In the example shown in FIG. 4, the fourth node provides the highest likelihood under condition NR-1. Under SNR-N condition in FIG. 4, the fifth node provides the highest likelihood. The likelihoods of the highest-likelihood models under different SNR conditions are compared with one another to select the model that provides the highest likelihood among the highest-likelihood nodes.

Step S8 (linear regression): The model linear linier transformation adaptation unit 5 applies Maximum Likelihood Regression (hereinafter abbreviated to MLLR) to the selected model so as to provide a further increased likelihood. The MLLR is described in a document entitled "Mean and variance adaptation within the MLLR framework" (M. J. F Gales et al., Computer Speech and Language, pp. 240-264, 1996). In particular, a phoneme sequence resulting from recognition is used to estimate a linear transformation matrix on the basis of an maximum likelihood criterion and the mean value and variances of HMM Gaussian distribution are adapted by linear transformation (linear regression).

Step S9 (re-recognition): When outputting the result of speech recognition, the speech recognition unit 3 uses the model obtained at step S8 to perform re-recognition and the re-recognition result is stored in the recognition result storage 6.

(Effect of the System)

According to the present invention, as has been described, a noise-added speech model is learned that has been produced by adding noise to speech by using a noise database. The distance between noise models are calculated and noise are clustered. Based on the result of the noise clustering, a speech model having a tree structure is generated.

First, the noise-added speech is clustered according to SNRs, then a tree-structure model is provided for each SNR condition and a tree-structure noisy speech model space is generated. In the feature extraction process, an input noisy speech to be recognized is analyzed to extract a feature parameter sequence and an optimum model is selected from the tree-structure noisy speech model space. Linear transformation is applied to the selected noisy speech model space so as to provide a further increased likelihood.

As has been described, the noise adaptation system according to the present invention uses noisy speech to be recognized to adapt a speaker-independent speech model. A tree-structure model space of noise-added speech is generated, optimum models are selected by following the tree structure downward, linear transformation (linear regression) is performed to generate an adapted model.

The inventor examined effects of recognition of noisy dialog speech that was performed by the present system. An example of the experiments will be described below.

A speech HMM used in the experiments is a shared-state, speaker-independent context-dependent phone HMM produced by using tree-based clustering. A total of 25 dimensions are used as feather quantities: MFCC (Mel Frequency Cepstral Coefficients) 12, their derivatives 12, and the first derivative of log power. A "mel frequency" is a value based on the sensitivity of the human ear and often used for representing the level of audibility of a sound. MFCC is generated as follows: discrete Fourier transform is applied to acoustic wave data and the resulting value is transformed into its logarithmic expression. Then inverse discrete Fourier transform is applied to the logarithm to produced a waveform, which is sampled at predetermined intervals. The sampled value is MFCC.

Figure 5:
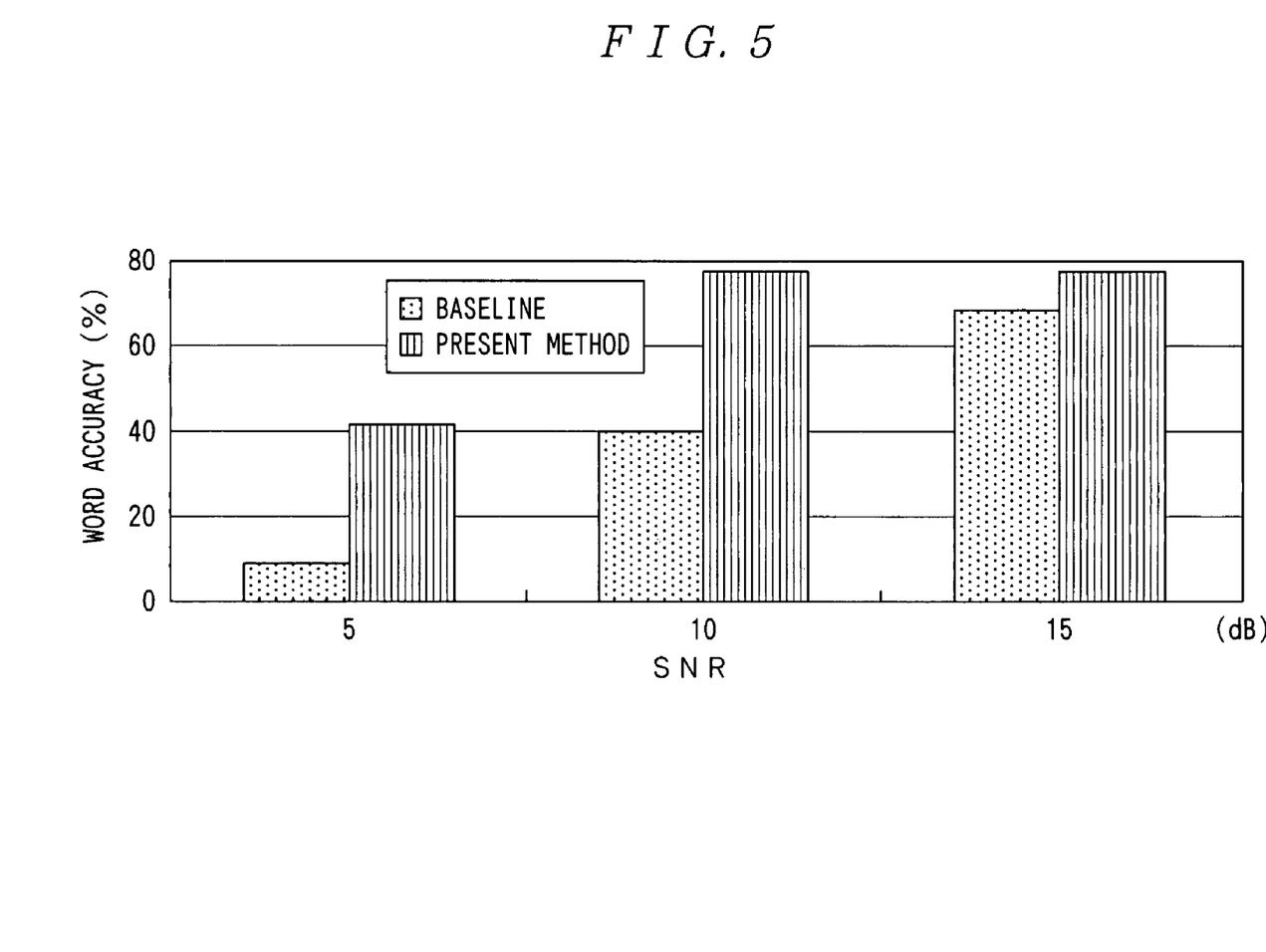
FIG. 5 shows a word accuracy achieved by using a speech HMM adapted by the system.

Effects of the present system will be described below with reference to FIG. 5. FIG. 5 shows a word accuracy (baseline) achieved by using a given speech HMM and a word accuracy (of the inventive method) achieved by using a speech HMM adapted by the method according to an embodiment of the present invention. The vertical axis in FIG. 5 represents the word accuracy (%) and the horizontal axis represents SNR (dB). The half-tone dot meshing bars in FIG. 5 represent the baseline accuracies and the striped bars represent the accuracies of the present system.

It can be seen from the results shown in FIG. 5 that the method according to the present invention is more effective than the conventional method. In this example, the word error rate of the present system is lower than the baseline by 36.1%.

Speech Model Noise Adaptation Method

The following noise adaptation method is implemented in the noise adaptation system described above. The method is a noise adaptation method for adapting a speech model for any noise that has been learned by using clean speech data to speech to be recognized in a noisy environment. The method comprises a clustering step of clustering noise-added speech; a speech model space generating step of generating a tree-structure noisy speech model space on the basis of the result of clustering at the clustering step; a parameter extracting step of extracting a speech feature parameter of input noisy speech to be recognized; a selecting step of selecting an optimum model from the tree-structure noisy speech model space generated at the speech model space generating step; and a linear transformation step of applying linear transformation to the model selected at the selecting step so as to provide a further increased likelihood. Because noise-added speech is consistently used both in the clustering and model learning processes, an improved accuracy of estimation of a speech model sequence of input speech can be achieved.

At the clustering step, the noise is added to the speech in accordance with the signal to noise ratio condition to generate the noise-added speech and the mean value of speech cepstral of the noise-added speech is subtracted, a Gaussian distribution model of the noise-added speech is generated, and the likelihood between the pieces of noise-added speech is calculated to generate a likelihood matrix, thus providing clusters. In this way, clustering of noise-added speech can be accomplished.

At the selecting step, the model that provides the highest likelihood for the feature parameter extracted at the parameter extracting step is selected. The accuracy of speech recognition can be improved by selecting and using the model that provides the highest likelihood.

At the selecting step, the tree-structure noisy speech model space is searched from the top to bottom to select models. By searching the tree structure downward in this way, an optimum model can be selected.

At the linear transformation step, linear transformation is performed based on the model selected at the selecting step so as to provide a further increased likelihood. Thus, the likelihood can be maximized.

(Speech Model Noise Adaptation Program)

A program for performing the process shown in FIG. 3 can be provided and used to control a computer to provide the same effects as those described above. The program is a noise adaptation program for speech recognition that controls a computer to adapt a speech model for any noise that has been learned by using clean speech data to speech to be recognized in a noisy environment. The program comprises a clustering step of clustering noise-added speech; a speech model space generating step of generating a tree-structure noisy speech model space on the basis of the result of clustering at the clustering step; a parameter extracting step of extracting a speech feature parameter of input noisy speech to be recognized; a selecting step of selecting an optimum model from the tree-structure noisy speech model space generated at the speech model space generating step; and a linear transformation step of applying linear transformation to the model selected at the selecting step so as to provide a further increased likelihood. Because noise-added speech is consistently used both in the clustering and model learning processes, an improved accuracy of estimation of a speech model sequence of input speech can be achieved.

At the clustering step, the noise is added to speech in accordance with the signal to noise ratio condition to generate the noise-added speech and the mean value of speech cepstral of the noise-added speech is subtracted, a Gaussian distribution model of the noise-added speech is generated, and the likelihood between the pieces of noise-added speech is calculated to generate a likelihood matrix, thus providing clusters. In this way, clustering of noise-added speech can be accomplished.

At the selecting step, the model that provides the highest likelihood for the feature parameter extracted at the parameter extracting step is selected. The accuracy of speech recognition can be improved by selecting and using the model that provides the highest likelihood.

At the selecting step, the tree-structure noisy speech model space is searched from the top to bottom to select models. By searching the tree structure downward in this way, an optimum model can be selected.

At the linear transformation step, linear transformation is performed based on the model selected at the selecting step so as to provide a further increased likelihood. Thus, the likelihood can be maximized.

A storage medium for storing the program may be a semiconductor, memory, a magnetic disk, an optical disk, or any of other storage media.

As has been described, the present invention has advantages that, because noise-added speech is consistently used both in the clustering and model learning processes, optimal clustering for many types of noise data and an improved accuracy of estimation of a speech model sequence for input speech can be achieved.

The present invention has an advantage that noise-added speech can be clustered by adding noise to the speech in accordance with signal-to-noise ratio conditions, subtracting the mean value of speech cepstral of each of the pieces of generated noise-added speech, generating a Gaussian distribution model of each of the pieces of noise-added speech, and calculating the likelihood between the pieces of noise-added speech to generate a likelihood matrix.

The present invention has an advantage that an improved accuracy of speech recognition can be achieved by selecting a model that provides the highest likelihood for an extracted speech feature parameter.

The present invention has an advantage that an optimum model can be selected by searching the tree-structure noisy speech model from the highest to level for an optimum model.

The present invention has an advantage that the likelihood can be maximized by performing linear transformation on the basis of the selected model so as to increase the likelihood.

What is claimed is:

1. A noise adaptation system of speech model for adapting a speech model for any noise to speech to be recognized in a noisy environment, said speech model being learned by using clean speech data, said system comprising:

clustering means for clustering noise-added speech;

speech model space generating means for generating a tree-structure noisy speech model space based on the result of the clustering performed by said clustering means;

parameter extracting means for extracting a speech feature parameter of input noisy speech to be recognized;

selecting means for selecting an optimum model from the tree-structure noisy speech model space generated by said speech model space generating means; and linear transformation means for applying linear transformation to the model selected by the selecting means so that the model provides a further increased likelihood, wherein said clustering means generates said noise-added speech by adding said noise to said speech in accordance with a signal-to-noise ratio condition, subtracts the mean value of speech cepstral of the generated noise-added speech, generates a Gaussian distribution model of each of pieces of generated noise-added speech, and calculates the likelihood between the pieces of noise-added speech to generate a likelihood matrix to provide a clustering result.

2. The noise adaptation system according to claim 1, wherein said selecting means selects a model that provides the highest likelihood for the speech feature parameter extracted by said parameter extracting means.

3. The noise adaptation system according to claim 2, wherein said linear transformation means performs the linear transformation on the basis of the model selected by said selecting means to increase the likelihood.

4. The noise adaptation system according to claim 2, wherein said selecting means selects a model by searching said tree-structure noisy model space downward from the highest to the lowest level.

5. The noise adaptation system according to claim 4, wherein said linear transformation means performs the linear transformation on the basis of the model selected by said selecting means to increase the likelihood.

6. The noise adaptation system according to claim 1, wherein said linear transformation means performs the linear transformation on the basis of the model selected by said selecting means to increase the likelihood.

7. A speech model noise adaptation method for adapting a speech model for any noise to speech to be recognized in a noisy environment, said speech model being learned by using clean speech data, said method comprising:

a clustering step of clustering noise-added speech;

a speech model space generating step of generating a tree-structure noisy speech model space based on the result of the clustering performed at said clustering step;

a parameter extracting step of extracting a speech feature parameter of input noisy speech to be recognized;

a selecting step of selecting an optimum model from the tree-structure noisy speech model space generated at said speech model space generating step; and a linear transformation step of applying linear transformation to the model selected at the selecting step so that the model provides a further increased likelihood, wherein said clustering means generates said noise-added speech by adding said noise to said speech in accordance with a signal-to-noise ratio condition, subtracts the mean value of speech cepstral of the generated noise-added speech, generates a Gaussian distribution model of each of pieces of generated noise-added speech, and calculates the likelihood between the pieces of noise-added speech to generate a likelihood matrix to provide a clustering result.

8. A computer readable medium storing a noise adaptation program for speech recognition causing a computer to execute a process for adapting a speech model for any noise to speech to be recognized in a noisy environment, said speech model being learned by using clean speech data, said program comprising:

a clustering step of clustering noise-added speech;

a speech model space generating step of generating a tree-structure noisy speech model space based on the result of the clustering performed at said clustering step;

a parameter extracting step of extracting a speech feature parameter of input noisy speech to be recognized;

a selecting step of selecting an optimum model from the tree-structure noisy speech model space generated at said speech model space generating step; and a linear transformation step of applying linear transformation to the model selected at the selecting step so that the model provides a further increased likelihood, wherein said clustering means generates said noise-added speech by adding said noise to said speech in accordance with a signal-to-noise ratio condition, subtracts the mean value of speech cepstral of the generated noise-added speech, generates a Gaussian distribution model of each of pieces of generated noise-added speech, and calculates the likelihood between the pieces of noise-added speech to generate a likelihood matrix to provide a clustering result.

* * * * *